Figure 1:
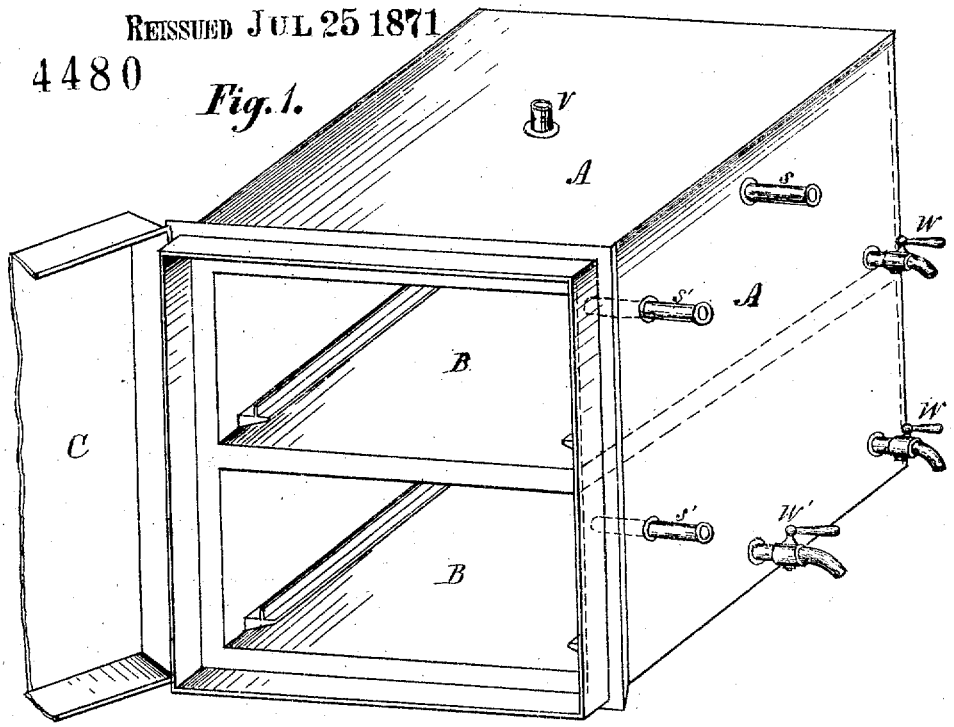

2 Sheets-Sheet 1.

Division "B"

John Ashcroft,

Colouring and Maturing Coffee Berry.

REISSUED JUL 25 1871

4480

Witnesses:

S. W. Wagner

Lewis B. Wynne, Jr.

Inventor:

John Ashcroft, by Johnson, Klaucke & Co.

his attorneys.

2 Sheets- Sheet 2.
4480
John Ashcroft
Colouring and Roasting Coffee Berry
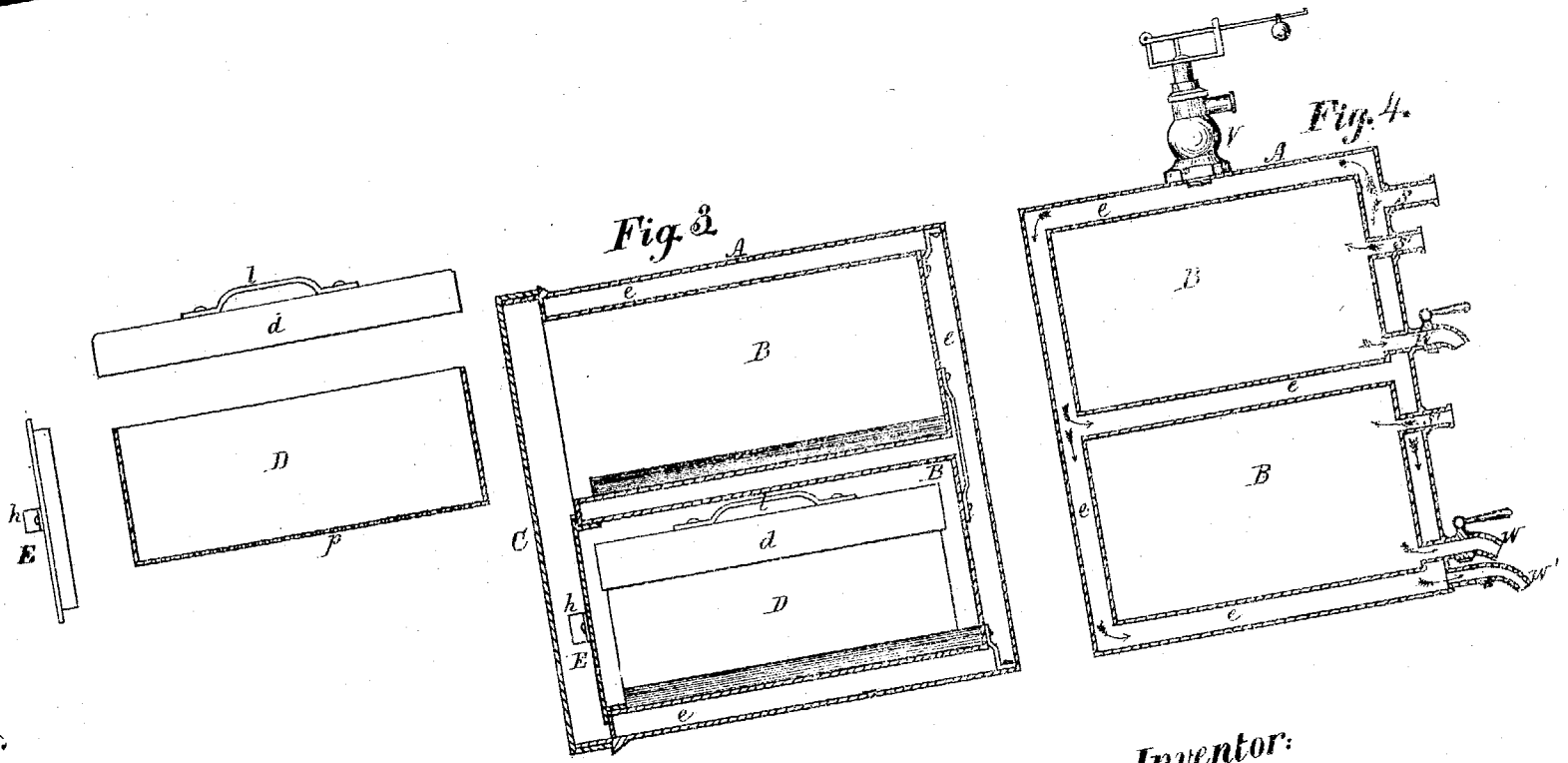
Witnesses:
West Wagner.
Lewis B. Wynne, Jr.
Inventor:
John Ashcroft,
by Johnson, Klaucke & Co
his attorneys.

UNITED STATES PATENT OFFICE.

JOHN ASHCROFT, OF BROOKLYN, NEW YORK, ASSIGNOR TO SARAH JANE ASHCROFT, OF SAME PLACE.

IMPROVEMENT IN TREATING COFFEE.

Specification forming part of Letters Patent No. 113,832, dated April 18, 1871; reissue No. 4,480, dated July 25, 1871.

DIVISION B.

*To all whom it may concern:*

Be it known that I, JOHN ASHCROFT, of Brooklyn, in the county of Kings and State of New York, have invented a new and useful Apparatus and Process for Treating the Raw Coffee-berry, Coloring, and Maturing it, of which the following is a specification:

It is well known to importers of certain kinds of coffee that its value is increased in proportion to the yellowness or brownness of its color, showing maturity. Coffee when first shipped is generally of a pale-green color, and of a soggy appearance, but on arrival in this or other countries sometimes turns out of a very handsome yellow, brown, or golden color, and of matured appearance, which materially increases its commercial and other value. It has been ascertained that the vessels which have turned out the brownest and most matured coffee on arrival at their destined ports are those which have experienced the longest and stormiest voyages, and which have been obliged by stress of weather to keep the hatches closely battened down, thus keeping the coffee entirely without ventilation, so that, in consequence of the warmth produced by close confinement in the hold of the vessel, it becomes gradually heated, and its color changed thereby from the pale green to more or less of the yellow or brown color, according to the length of the voyage and consequently of the confinement of the coffee. On the other hand, those vessels which have made quick voyages with fair weather, and have been open during the passage and well ventilated, have invariably turned out the coffee in nearly the same condition, as to color and matured appearance as when originally shipped. Coffee when thoroughly colored, browned, or matured is much more valuable to commerce than pale coffees, which contain heavy green berries, which do not roast evenly, and also give out a bitter taste; hence my apparatus and process are to accomplish rapidly what it otherwise takes a long time or lapse of years to accomplish, and with a large percentage of gain, and by my process there is less loss in weight and shrinkage, none of the essential properties of the coffee being destroyed, all the coffee-grains being evenly colored and uniformly dry, presenting no unevenness, and not requiring so many different processes when prepared for use. The coffee is greatly improved in appearance and drinking qualities, making it more desirable both to those who deal in it in the raw state and also to those who prepare it for final consumption. The process of sweating, coloring, and maturing coffee, which increases its commercial value, is well known to importers. When a cargo is dampened by water or moisture it heats and sweats, thus imparting to the coffee a rich yellow color. The manner in which I treat unmatured or pale-green coffee produces this much-desired result, and greatly enhances its value, as has been proved by experiment. In Arabia coffee ripens fully on the trees. It is shaken off, dried in the shade, and is of a superior quality, the small berries attaining their seasoning in some three years. East and West India coffee is cured by exposing layers of the fruit several inches thick to the heat of the sun, so that fermentation takes place. The worst coffee in America will, in from ten to fourteen years, become as good and acquire as high a flavor as the best we now have from Turkey.

My process, in a measure, disperses the fragrant volatile oil called caffeine from near the outer shell through the solid substance, thus enabling the raw bean to be exposed to the atmosphere with less detriment. Raw coffee is liable to be damaged by absorbing the odors of other substances, such as sugar, spices, &c., and when so damaged my process remedies the injury, and restores the coffee to its natural condition, in addition to producing the desirable coloring and maturing.

Figure 2:
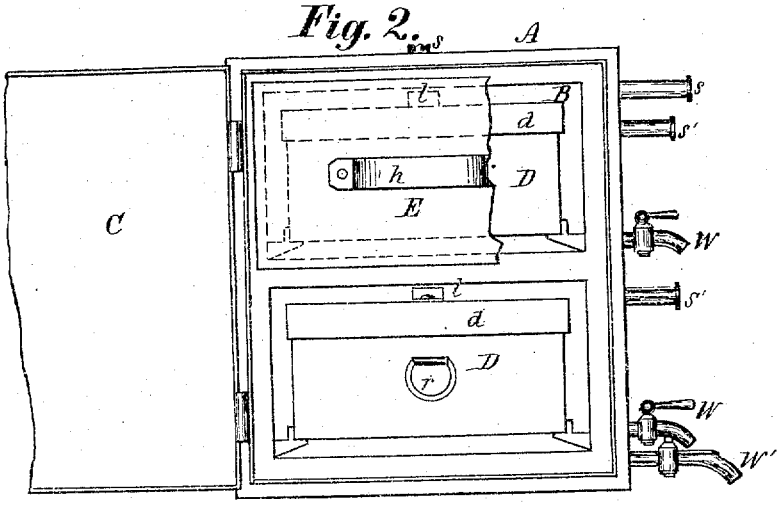

In the drawing, Figure 1 is a perspective view of my apparatus, the sweating-boxes of the ovens and their lids being removed. Figure 2 is a front view of the same. Fig. 3 is a longitudinal section, and Fig. 4 a transverse section of my apparatus.

A indicates the outer shell or frame, which may be made of metal or any other suitable material, and which may have on its outer side any additional non-conducting material. B represents compartments, around which steam circulates, which is admitted through a pipe or pipes, *s*. D represents sweating-boxes, having perforated bottoms *p* for the admission of steam when desired to be let into the compartments B through the pipes *s'*, which enter said compartments. The steam-pipes *s* and *s'* may have valves or stopcocks by which to regulate the quantity of steam to be used in heating the space *e* or in the compartments B, there to have direct contact with the coffee in the sweating-boxes D through the perforations in them, which may be in any part of the same, but preferably the bottom. E represents the lids or doors of the compartments or sweating-ovens B. These have handles *h*, and the sweating-boxes D have also handles *l* attached to their lids *d*, and rings or other handles, *r*, enabling the boxes to be easily handled. C is a hinged door or lid covering the ovens B, their lids E, and the sweating-boxes D, in order to economize heat and prevent as far as possible the radiation as well as the evaporation of the aroma of the coffee-berry. W represents valves or water-cocks whereby to draw off from the ovens or compartments B the water resulting from the condensation of steam in the heating-chamber or jacket *e*. V represents any ordinary safety-valve, a precautionary appliance in case the pressure of the steam in chamber *e* should become too high.

By applying steam directly in proper quantities through pipes *s'* into compartments B, which enter the sweating-boxes D through their perforated bottoms *p*, I supply the desired moisture to produce sweating, which, being aided by the outward drying heat in chamber *e*, the sweating, coloring, and maturing process is thus accomplished in from one to four days, instead of so many years, the economy of which is obvious.

In the example shown the sweating-boxes are slid into the ovens on ledges, so as to leave their perforated bottoms free to receive the steam which enters the ovens, and thus steam is caused to act directly upon the coffee and permeate the whole mass so as to produce the requisite degree of hot moisture and sweating, while the ovens themselves may be kept hot by surrounding them with hot air or steam, and thereby heat the sweating-boxes externally so as to dry the coffee therein. These sweating-boxes are adapted to receive the coffee in sacks, but the coffee may be emptied into the boxes. The steam while entering the perforations in the sweating-boxes may also surround them as well as the ovens.

Damaged cargoes of coffee can be saved by my process to a great extent. I can carry out the same principle on a large scale by taking rooms or halls of any desirable size, supplying the moistening steam for sweating and expanding the berries, and other heat, such as hot air, for drying, by means of pipes or otherwise. In this way, in a room having tiers of perforated shelves covered with bags of coffee, ventilation being cut off, and into which room or rooms steam can be introduced, and also dry heat, by means of coils of pipe or otherwise, I can cure a whole cargo of coffee at one time, producing the desired result.

Having described my invention, I claim—

1. In apparatus for coloring and maturing coffee, to increase its commercial and other value, a perforated sweating-box or a series of such boxes, in combination with an inclosing-chamber or oven and inlet steam-pipes, as described.

2. In combination with closed sweating-boxes in which steam is admitted directly upon coffee, the external drying-chamber into which steam or other heat is admitted to heat the ovens of the sweating-boxes, as described.

3. In apparatus for coloring and maturing coffee, the perforated sweating-boxes having a surrounding steam-chamber, and an inclosing oven having a surrounding heating-chamber, as described.

In witness whereof I have hereunto signed the above specification of my apparatus and process for maturing and browning coffee this 1st day of July, A. D. 1871, before two subscribing witnesses.

JOHN ASHCROFT.

Witnesses:
A. E. H. JOHNSON,
I. W. HAMILTON JOHNSON.